Figure 1:
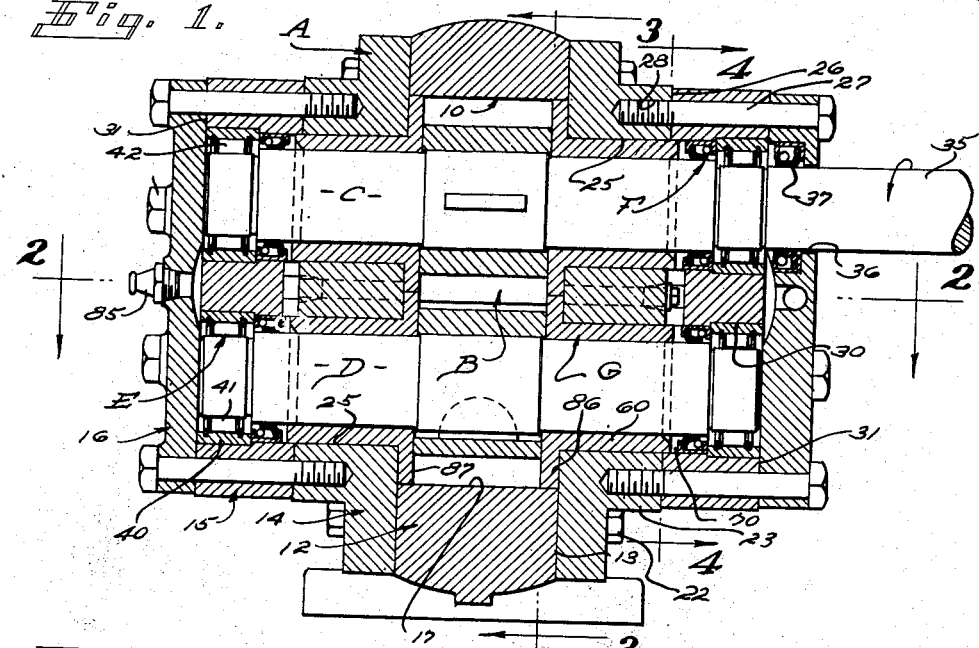

March 16, 1954

H. HARVEY 2,672,100

CONSTRUCTION FOR ROTARY PUMPS

Filed July 1, 1949

2 Sheets-Sheet 1

INVENTOR.
Herbert Harvey
BY
Attorney

March 16, 1954
H. HARVEY
2,672,100
CONSTRUCTION FOR ROTARY PUMPS
Filed July 1, 1949
2 Sheets-Sheet 2
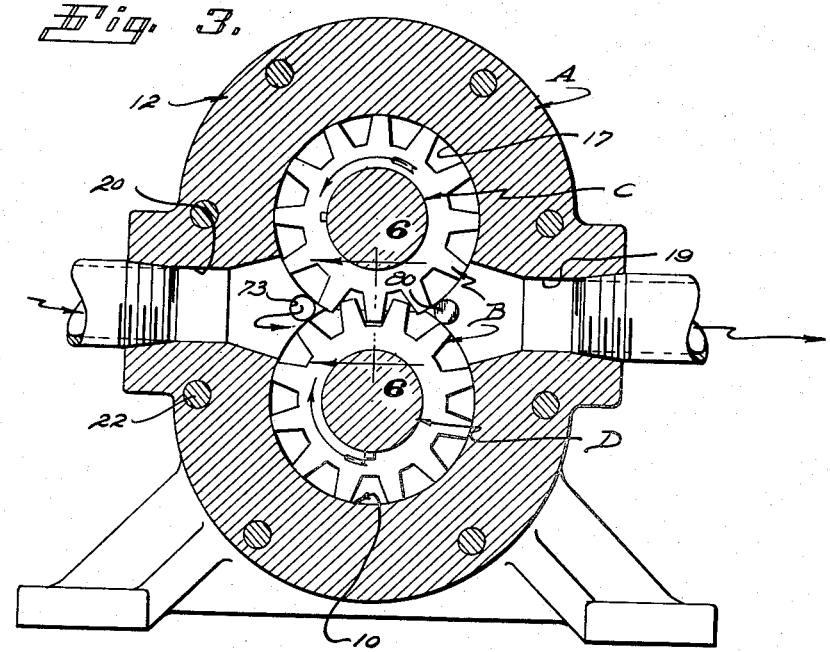
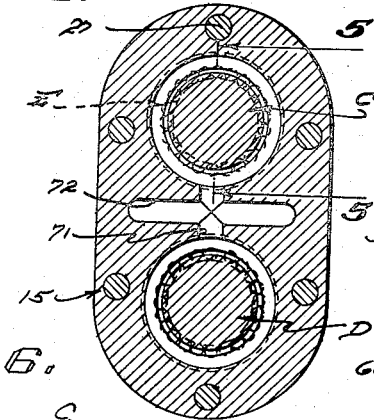
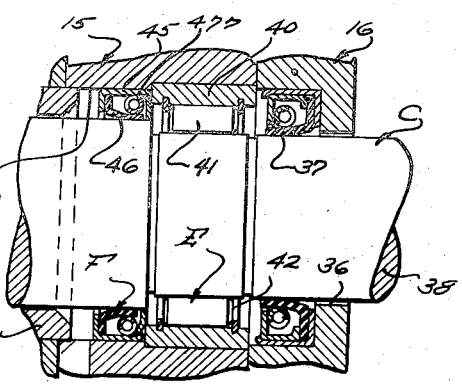
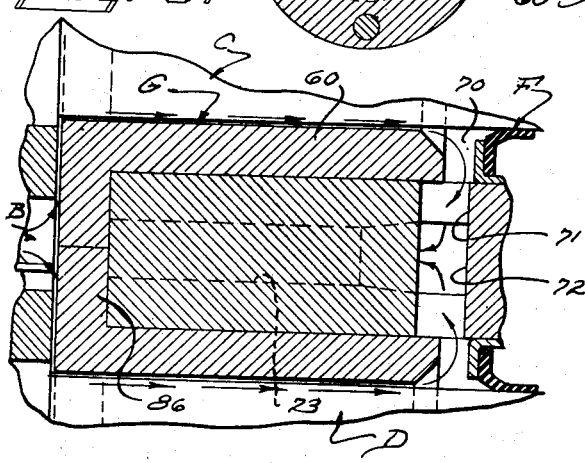
INVENTOR.
Herbert Harvey
BY
Attorney Patented Mar. 16, 1954

2,672,100

UNITED STATES PATENT OFFICE 2,672,100

CONSTRUCTION FOR ROTARY PUMPS

Herbert Harvey, Los Angeles, Calif., assignor, by mesne assignments, to United States Steel Corporation, a corporation of New Jersey Application July 1, 1949, Serial No. 102,570

2 Claims. (Cl. 103—126)

This invention has to do with a construction for rotary pumps such, for example, as gear pumps, or the like, and it is a general object of the invention to provide a pump construction which involves adequate, dependable bearings carrying the rotating parts and which provides practical, effective and dependable fluid seals for the rotating parts, which seals will operate over a long period of time without attention or appreciable variation in action.

Rotary pumps such as gear pumps used to handle various fluids commonly give trouble by reason of the fluid being pumped leaking around or along the shafts that carry the rotating parts and ordinary packing means employed in such structures may operate for a limited time under ideal conditions, but usually wear rapidly, and if the fluid being handled carries foreign matter such packing constructions erode and, as a result, the performance of the pump is not uniform.

A further object of the present invention is to provide a rotary pump wherein the shafts carrying the rotating parts are supported in the case by anti-friction bearings while sealing sleeves are carried in the case inward of the bearings and effectively prevent any appreciable leakage of fluid along the shafts. With the construction of the present invention the sealing sleeves which fit around the shafts are not relied upon to establish or to maintain an absolute fluid-tight connection around the shafts, but rather, they are of substantial length and they fit the shafts with some clearance, to the end that flow around or along the shafts is effectively restricted so that there is but limited leakage and the fluid that does leak is conducted back into the body of fluid being handled by the pump.

Another object of the invention is to provide a rotary pump in which lubricant seals are located inward of each of the anti-friction bearings and the lubricant seals separate the lubricant at the bearings from the fluid which is passed by the fluid seals.

A further object of the invention is to provide a rotary pump wherein the case that handles and carries the various working parts is sectional.

Figure 2:
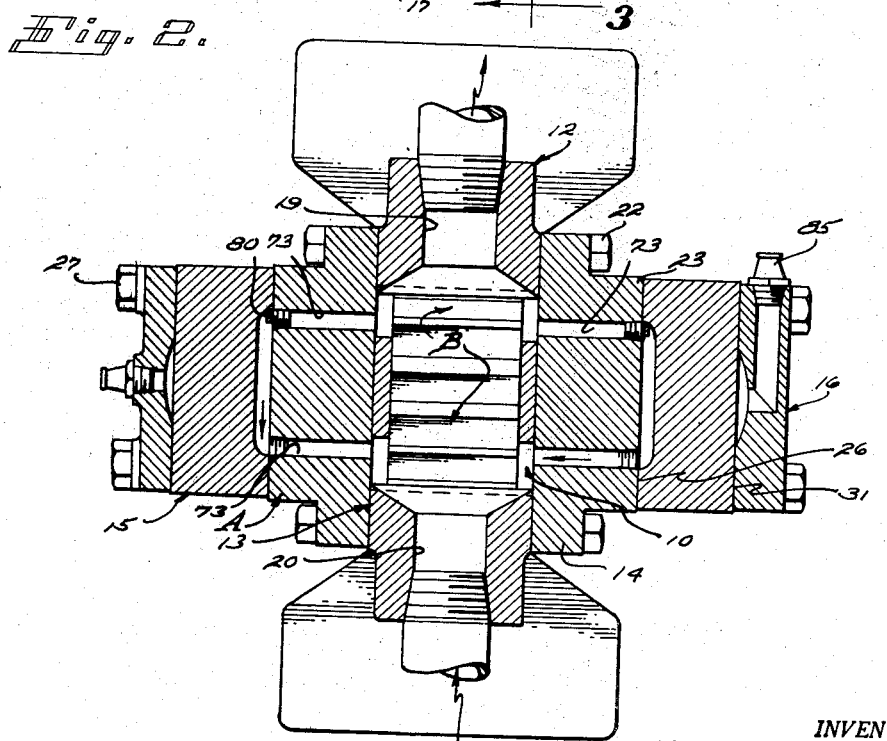

The various objects and features of my invention will be fully understood from the following detailed description of a typical preferred form and application of the invention, throughout which description reference is made to the accompanying drawings, in which:

Fig. 1 is a vertical longitudinal sectional view of the pump provided by the present invention. Fig. 2 is a plan section of the pump taken as indicated by line 2—2 on Fig. 1. Fig. 3 is a vertical transverse sectional view of the pump taken as indicated by line 3—3 on Fig. 1. Fig. 4 is a vertical transverse sectional view taken as indicated by line 4—4 on Fig. 1. Fig. 5 is an enlarged detailed sectional view taken at one of the anti-friction bearings showing the lubricant seals related to that bearing, and Fig. 6 is an enlarged detailed sectional view taken in the direction of line 6—6 on Fig. 3, indicating the manner in which a limited amount of fluid may circulate in or through the fluid seals as the pump operates.

The construction provided by the present invention is applicable, generally, to rotary pumps and is particularly practical as applied to gear type pumps, or the like. In the case illustrated the invention is shown applied to a gear type pump wherein two simple or conventional gears are meshed and serve as the members which propel the fluid, and the construction is such as to develop a substantial pressure.

The construction embodying the present invention comprises, generally, a case A which defines chambers 10 through which fluid is circulated by meshing gears B. Spaced shafts C and D carry the meshing gears B and are rotatably supported in the case by means of anti-friction bearings E. Lubricant sealing means F is provided in connection with each bearing E and fluid sealing means G is provided on each shaft inward of each of the anti-friction bearings supporting the shaft.

The case A, in accordance with the present invention is of sectional construction and includes a main or center section 12 having flat ends 13, end plates 14 which are secured to the sides 13 of the center section 12, bearing plates 15 which are secured to the outer sides of the end plates 14, and cover plates 16 which are secured to the outer ends of the bearing plates 15.

The main or center section 12 of the case is a block-like element with openings extending through it from one side 13 to the other, which openings form the chambers 10 and communicate with or join each other. The walls 17 of the openings through the case which define the chambers 10 are curved concentric with the axes of the shafts C and D, as clearly illustrated in Fig. 3 of the drawings. Liquid handling ports 19 and 20 enter the block forming the center section 12 from diametrically opposite points and open into the chambers 10 where the chambers adjoin at the center of the block. One of these ports acts as an inlet port while the other acts as an outlet port and, as is characteristic of gear pumps when the gears are operated in one direction, one of the ports is the inlet port, whereas when the gears are operated in the opposite direction the other port is the inlet port.

The end plates 14 may be simple flat plates which are alike and which are secured to the ends 13 of the center section 12 by suitable fastening means such as screw fasteners 22. The particular fasteners shown in the drawings are bolts suitably spaced around the case. In the construction illustrated each end plate 12 is provided with an outwardly projecting central boss 23 so that the portions of the plate which pass the shafts and which carry the bearing plates 12 are of substantial thickness or extent lengthwise of the shafts, as clearly shown in Fig. 1 of the drawings. The end plates 14 have round openings or bores 25 concentric with the shafts C and D, which openings contain the fluid seals G, as will be hereinafter described.

The bearing plates 15 are preferably like flat plates secured to the outer sides or ends 26 of the bosses 23 on the end plates 14. In the case illustrated the bearing plates are secured to the end plates 14 by suitable fasteners 27 shown in the form of cap screws engaged in tapped openings 28 provided in the bosses 23. The bearing plates 15 have round openings or bores 30 which align with the openings 25 in the end plates and which contain the anti-friction bearings E.

The cover plates 16 are secured to the outer ends or faces 31 of the bearing plates 15 preferably by the same fasteners 27 which hold the bearing plates to the end plates. In the form of construction illustrated the shafts C and D are supported so that they are parallel with each other on spaced axes that extend through the chambers 10 in the section 12. The shaft D terminates in the case with its ends within the bearing plates and so that it is confined in the case by the cover plates 16. The shaft C is confined at one end of the case by the cover plate occurring at that end of the case, whereas an extension 35 of the shaft C extends from the other end thereof to project outwardly through an opening 36 provided in the other cover plate. In practice a suitable lubricant seal 37 is provided around the shaft extension 35 where it passes through the last mentioned cover plate.

The fluid circulating members B which are preferably gears are fixed or keyed on the shafts C and D within the chambers 10, and in the case illustrated they are simple spur gears that mesh in the center of the case where the chambers 10 join.

The bearings E are preferably anti-friction bearings supported in the bearing plates 15 and serving to rotatably support the end portions of the shafts C and D. In the case illustrated each anti-friction bearing is carried in an opening 30 of a bearing plate and it is a roller type bearing involving an outer roller supporting race or ring 40 closely fitted in the opening 30. Rollers 41 operate in the ring 40 and engage a suitably finished part of the supported shaft. In accordance with conventional roller bearing construction suitable retainers 42 may be provided to retain the rollers in proper position relative to the rings 40.

In accordance with the present invention a lubricant seal F is located immediately inward of each anti-friction bearing E and is so arranged or faced as to effectively confine lubricant to the bearings. As best shown in Figure 5, each lubricant seal F includes a holder 45 mounted in the bearing plate and a sealing member 46 carried by the holder with a sealing lip in engagement with the shaft. A suitable retainer or actuating member 47 engages the lip portion of the sealing member to hold it in proper sealing engagement with the shaft. The lip faces outward or toward the bearing so that it is highly effective in checking the escape of lubricant inward along the shaft from the bearing.

The present invention provides fluid sealing means G around the shafts C and D inward of the shaft supporting bearings E and in the preferred arrangement the fluid sealing means are confined to and carried by the ends of end plates 14 of the case between the gears that are secured on the shafts and the lubricant seals F which are provided on the shaft inward of the bearings E.

In the preferred form of the invention each fluid sealing means G is a simple tubular member or sleeve 60 which fits snugly into an opening 25 in an end plate 14 while it fits around a shaft with suitable working clearance. In carrying out the present invention the shafts may bear in the fluid sealing sleeves G, particularly as the construction is originally manufactured. However, the sleeves 60 are not relied upon as bearings even though, in practice, they may be advantageously formed of a bearing material such as bronze, or the like.

In the form of the invention illustrated the fluid sealing sleeves 60 are provided at their inner ends with outward radially projecting flanges 86 located within the chambers 10, as defined by the central section 12 of the case and the faces 87 of the flanges 86 define the ends of the chambers in which the gears B operate. The flanges 86 retain the sleeves 60 against outward displacement and, in practice they may be formed of bronze or other suitable bearing material so that they provide suitable faces at the ends of the gears and closely fitting the ends of the gears, so that there is no appreciable leakage at this point.

As the pump operates, the shafts turn in the sealing sleeves 60 with working clearance originally established between these parts or which soon occurs as a result of wear. As pressure is developed on fluid being handled by the pump through the action of the gears on the shaft, it tends to leak or escape along the shafts toward the bearings which support the shafts. By relating the sealing sleeves 60 to the shafts so that there is but limited working clearance between the sleeves and the shafts and by making the sleeves of substantial length, as shown in the drawings, the openings afforded through the sleeves and through which fluid may escape, are so limited that the escape of fluid is restricted, and in practice a very small amount of fluid actually flows through the sleeves. Since the sleeves 60 are not relied upon as bearings and do not act as bearings, the limited clearance provided between these sleeves and the shafts will remain substantially constant over a very long period of time, so that a particular pump constructed in accordance with the invention will have a given amount of leakage and this leakage remains as a substantially constant factor as the pump operates.

In accordance with the present invention there is an annular catch chamber 70 between each sleeve 60 and its adjoining lubricant seal F and the two annular chambers 70 located at each end of the structure are joined by a connecting passage 71. Extensions 72 of each catch chamber communicate with return ports 73 which are provided in the end plates 14 and which extend inwardly to communicate with the ports which handle fluid being circulated by the pump. In the preferred form of the invention the passages 71 and 72 of the catch chambers are in the form of channels or recesses provided in the inner sides of the bearing plates 15 as shown in Fig. 4 of the drawings. In accordance with the present invention there are two return ports 73 in each end portion of the case or in each end 14 of the case, so that each catch chamber may communicate with each such return port. In practice the two return ports in each end 14 extend to and communicate with the ports 19 and 20, one of which latter ports is an inlet port while the other acts as a discharge port. Closures or plugs 80 are provided in the return ports 73 which communicate with the discharge port, with the result that fluid passed by the sleeves 60 and entering the catch chambers is conducted from the catch chambers to the inlet port in the main section of the case. It will be apparent that when the direction of operation of the pump is reversed the plugging of the return ports 73 may be reversed so that under any operating condition fluid escaping past the fluid sealing sleeves 60 is conducted to the inlet side of the pump.

From the foregoing description it will be apparent that the general construction of the case provided by the present invention is simple and inexpensive while at the same time the shafts which carry the gears are effectively supported in antifriction bearings so that they will operate efficiently over long periods of time. The lubricant applied to the bearings, as through suitable lubricant connections 85, is effectively maintained in or at the bearings and the slight or limited leakage that occurs around the shafts past the sealing sleeves 60 does not escape from the exterior of the case and does not ever reach the bearings, but rather is simply circulated through the catch chambers and the return ports to the inlet or suction side of the pump. With proper limited working clearance between the sleeve 60 and the shafts a limited amount of leakage occurs around the shafts and consequently this leakage does not materially impair the action of the pump.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A rotary pump comprising a case of sectional construction having a main central section, apertured end plates fixed to the sides of said central section, apertured bearing plates fixed to the sides of said end plates, and covers fixed to the outsides of said bearing plates, said central section having a pair of connecting chambers formed within its interior and an inlet and an outlet communicating with said chambers, opposed pairs of axially aligned bearings supported in said bearing plates and spaced from the opposite sides of each of said chambers, a pair of shafts, each of which is rotatably mounted in a different opposed pair of said bearings and extends through a different one of said chambers, fluid circulating elements carried by said shafts within said chambers, and means in the space at each side of each chamber for excluding fluid in the chamber from the adjacent bearing, each of said means including a sleeve snugly supported in one of said end plates adjacent the chamber and rotatably receiving the shaft, and a seal supported in the adjacent bearing plate adjacent the bearing inwardly thereof and spaced from the outer end of said sleeve and rotatably receiving the shaft, the intervening space between said sleeve and said seal constituting a catch chamber for fluid which leaks between the shaft and seal, said end plates containing return passages from said catch chambers to said inlet.

2. A rotary pump comprising a case having a pair of connecting chambers formed within its interior and an inlet and an outlet communicating with said chambers, opposed pairs of axially aligned bearings supported in said case and spaced from the opposite sides of each of said chambers, a pair of shafts, each of which is rotatably mounted in a different opposed pair of said bearings and extends through a different one of said chambers, fluid circulating elements carried by said shafts within said chambers, and means in the space at each side of each chamber for excluding fluid in the chamber from the adjacent bearing, each of said means including a sleeve snugly supported in the case adjacent the chamber and rotatably receiving the shaft, an annular metal holder mounted in the case adjacent the bearing inwardly thereof and spaced from the outer end of the adjacent sleeve, a flexible sealing member mounted in said holder and having a lip rotatably receiving the shaft at a location spaced from said sleeve, and a retainer between said lip and said holder maintaining the lip against the shaft, the intervening space between said sleeve and said lip constituting a catch chamber for fluid which leaks between the shaft and sleeve, said case having return passages from the catch chambers to said inlet.

HERBERT HARVEY.

References Cited in the file of this patent

UNITED STATES PATENTS

| Number | Name | Date |
|---|---|---|
| Re. 18,251 | Wilson | Nov. 17, 1931 |
| 1,010,956 | Read et al. | Dec. 5, 1911 |
| 1,348,772 | Auger | Aug. 3, 1920 |
| 1,362,621 | Hawley | Dec. 21, 1920 |
| 1,478,417 | Wottring et al. | Dec. 25, 1923 |
| 1,567,923 | Devon | Dec. 29, 1925 |
| 1,597,411 | Kinney | Aug. 24, 1926 |
| 1,737,942 | Pagel | Dec. 3, 1929 |
| 1,781,619 | Wendell | Nov. 11, 1930 |
| 1,787,543 | Nichols | Jan. 6, 1931 |
| 1,927,395 | Edwards | Sept. 19, 1933 |
| 2,040,754 | McLeod | May 12, 1936 |
| 2,082,412 | Morton | June 1, 1937 |
| 2,176,322 | Barrett | Oct. 17, 1939 |
| 2,195,886 | Hawley, Jr. | Apr. 2, 1940 |
| 2,202,913 | Johnson | June 4, 1940 |
| 2,279,136 | Funk | Apr. 7, 1942 |
| 2,302,966 | MacNeil et al. | Nov. 24, 1942 |
| 2,312,891 | Ferris | Mar. 2, 1943 |
| 2,321,609 | Marco | June 15, 1943 |
| 2,395,824 | Herman | Mar. 5, 1946 |
| 2,420,622 | Roth et al. | May 13, 1947 |
| 2,451,603 | Barker | Oct. 19, 1948 |

FOREIGN PATENTS

| Number | Country | Date |
|---|---|---|
| 82,348 | Austria | Jan. 10, 1921 |